April 20, 1943.  J. CHAPLIN  2,316,933
GATE VALVE
Filed April 15, 1941    2 Sheets-Sheet 1

Inventor.
Joseph Chaplin
Attorney.

April 20, 1943.   J. CHAPLIN   2,316,933
GATE VALVE
Filed April 15, 1941   2 Sheets-Sheet 2

Inventor.
Joseph Chaplin
By Chaplin & Ferguson
Attorney

Patented Apr. 20, 1943

2,316,933

UNITED STATES PATENT OFFICE 2,316,933

GATE VALVE

Joseph Chaplin, Baltimore, Md.

Application April 15, 1941, Serial No. 388,677

1 Claim. (Cl. 251—167)

This invention relates to improvements in gate valves and has for its object to provide a valve in which the gate can be easily raised or lowered to open or close the valve, and which is provided with means for sealing the valve in either the open or closed position. A further object of the invention is to provide a lining for the valve which can be removed when worn and replaced with a new lining, also to provide a removable ring for the gate which can also be removed and replaced with a new one when worn, so that there will be an unobstructed passage through the valve and gate, and a perfect seal at all times.

The invention consists of the novel construction and arrangement of the parts and combination of parts hereinafter more fully set forth in the following specification and pointed out in detail in the appended claim.

In the accompanying drawings—

Figure 1:
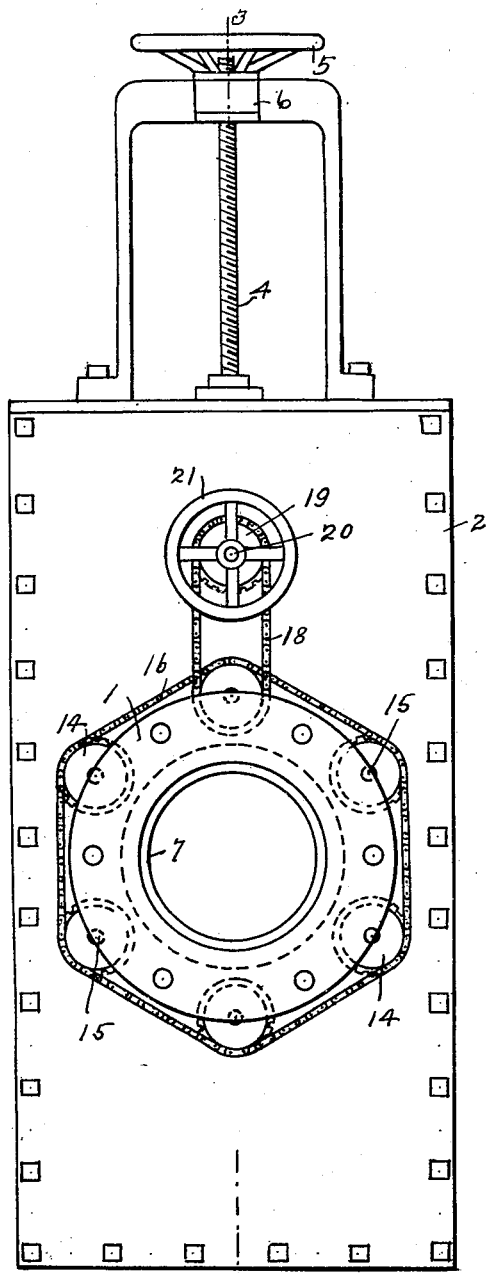
Figure 1 is a side elevation of a gate valve embodying my invention.
Figure 2:
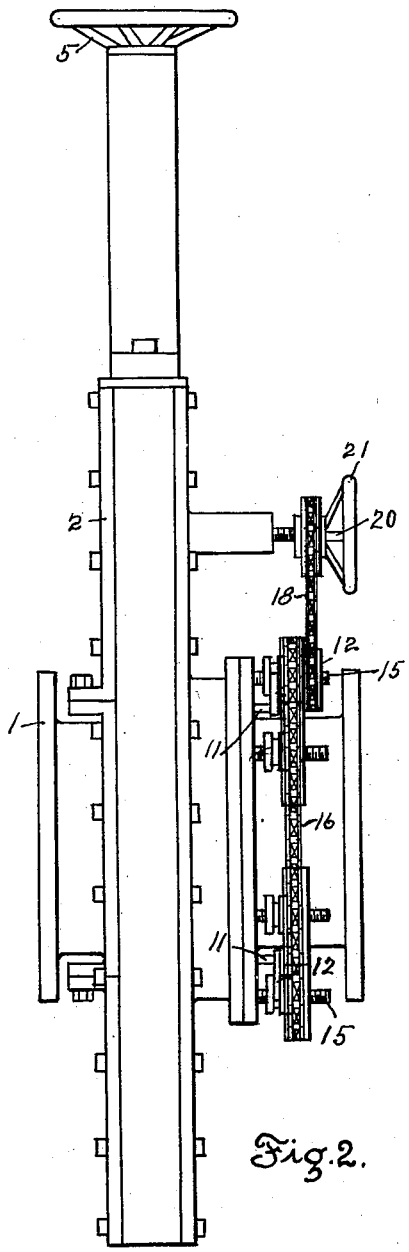
Figure 2 is an edge view of Figure 1.
Figure 3:
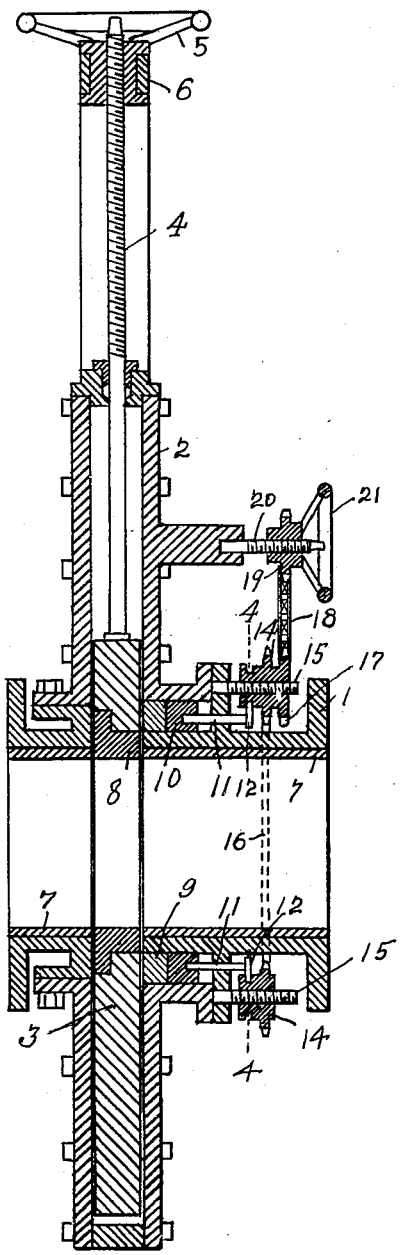
Figure 3 is a section in the line 3—3 of Figure 1.
Figure 4:
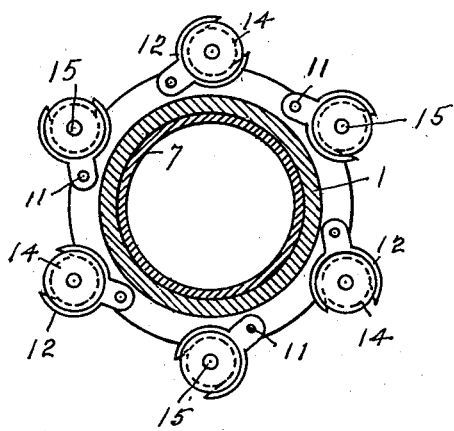
Figure 4 is a detail section of the valve on the line 4—4 of Figure 3.

Referring to the accompanying drawings, forming part of this specification, and in which like reference numerals designate like parts throughout the several views thereof, I designates the body of the valve to which the casing 2 is bolted, and 3 the gate which is mounted in the said casing 2 and adapted to be raised and lowered therein to close or open the valve. The said gate 3 is secured to the inner end of the rod 4 which latter is threaded on its upper end and is raised and lowered by means of the threaded wheel 5 revolubly mounted on the bearing 6. By turning the wheel 5 in one direction the gate 3 will be raised and the valve closed and by turning the wheel 5 in the opposite direction the gate 3 will be lowered and the valve opened, as shown in Figure 3 of the drawings. The valve body 1 is bolted to the casing 2 and has a removable lining 7 so that the said lining can be removed when worn and replaced with another one, so that the body proper will not have to be replaced. The valve gate 3 has a removable ring 8 secured thereto and having its inner surface flush with the inner surface of the lining 7 of the valve body 1. This ring 8 can be removed when worn and replaced with a new one. Surrounding the outer surface of the body 1 adjacent the valve gate 3 is a gasket 9 of rubber, or other suitable material, and back of said gasket 9 is a metal ring 10 in which is secured the inner ends of the pins 11. The outer ends of said pins 11 each has a yoked arm 12 secured thereto the yoked ends of which extend into a groove in the hub of the sprocket wheels 14. The said sprocket wheels 14 are each mounted on a threaded rod 15 and all of the sprockets are connected by a chain 16. One of said sprocket wheels has an extra sprocket 17 which is connected by a chain 18 to the sprocket wheel 19. The said sprocket wheel 19 is mounted on a threaded rod 20 extending from the side of the casing 2. This sprocket wheel 19 is provided with a hand wheel 21 by means of which the sprocket wheel 19 is turned on the threaded rod 20. When the valve gate 3 is in the open or closed position it is desirable to have a tight joint between the entrance end of the valve body and the gate valve to prevent leakage. When the gate 3 is in the open position, as shown in Figure 3 of the drawings, and it is desired to close the valve, the wheel 21 is turned in one direction the sprocket wheels 14 and 19 will be moved outwardly from the valve casing, thus causing the pins 11 to move outwardly carrying the ring 10 with them and releasing the pressure of the gasket on the gate 3 allowing the latter to be raised and the valve closed. As soon as the valve is completely closed the wheel 21 is turned in the opposite direction reversing the action of the sprocket wheels and forcing the ring 10 in against the gate 3 and sealing the valve against leakage when closed. When the valve is to be opened the action of the parts is repeated to release the gasket 9 from the gate 3 until it is lowered to open the valve when it can again be forced against the gate 3 to seal the joint.

Having thus described my invention, what I claim is:

A gate valve comprising a body having an entrance end and an exit end, a casing secured to said body and having an opening in line with the entrance and exit ends of said body, a gate movable up and down in said casing to open and close the opening in the body portion and having an opening therein to register with the opening in body portion, a removable lining in the gate opening, a gasket surrounding the outer surface of said body portion, a metal ring surrounding the outer surface of the body back of said gasket, pins connected to the said metal ring and projecting outside of the body, a yoked arm on the outer ends of each of said pins, threaded pins secured at their inner ends to the said body, a sprocket wheel on each of said threaded pins, a sprocket wheel mounted above said first named sprocket wheels and having a wheel secured thereto, and a chain connecting the first-named sprocket wheels with the last named sprocket wheel to turn the latter and move the pins and ring to force the gasket against or away from the gate.

JOSEPH CHAPLIN.